United States Patent
Miyadera (10) Patent No.: US 7,715,769 B2
(45) Date of Patent: May 11, 2010

(54) DISPLACEMENT CORRECTION DEVICE, DISPLACEMENT CORRECTION METHOD, AND IMAGE FORMING DEVICE

(75) Inventor: Tatsuya Miyadera, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 224 days.

(21) Appl. No.: 11/831,374

(22) Filed: Jul. 31, 2007

(65) Prior Publication Data
US 2008/0038024 A1   Feb. 14, 2008

(30) Foreign Application Priority Data
Aug. 8, 2006   (JP) ............................. 2006-215735

(51) Int. Cl.
 *G03G 15/01* (2006.01)
(52) U.S. Cl. .................................. 399/301
(58) Field of Classification Search ................ 399/301, 399/44; 347/116
See application file for complete search history.

(56) References Cited

U.S. PATENT DOCUMENTS

| | | | |
|---|---|---|---|
| 5,523,823 A | 6/1996 | Ashikaga | |
| 5,754,920 A | 5/1998 | Tanaka et al. | |
| 6,295,435 B1 * | 9/2001 | Shinohara et al. | 399/301 |
| 6,418,295 B1 * | 7/2002 | Sato | 399/301 |
| 6,693,654 B2 * | 2/2004 | Shinohara | 347/116 |
| 2002/0089579 A1 | 7/2002 | Yamanaka et al. | |
| 2006/0029407 A1 | 2/2006 | Sakamoto | |
| 2007/0122210 A1 | 5/2007 | Sato et al. | |

FOREIGN PATENT DOCUMENTS

| | | |
|---|---|---|
| EP | 1 575 258 A2 | 9/2005 |
| JP | 6-193476 | 7/1994 |
| JP | 2642351 | 5/1997 |

OTHER PUBLICATIONS

U.S. Appl. No. 12/210,491, filed Sep. 15, 2008, Miyadera.

* cited by examiner

*Primary Examiner*—Sandra L Brase
(74) *Attorney, Agent, or Firm*—Oblon, Spivak, McClelland, Maier & Neustadt, L.L.P.

(57) ABSTRACT

Sensors detect a displacement correction pattern image-formed on a transporting belt. A timing when the sensors execute a detecting operation is preliminary set depending on a tolerance in a layout or a dimension of a portion where the displacement correction pattern is image-formed, detected. Based on the detected timing detected by the sensors, the preliminary set timing is modified.

20 Claims, 11 Drawing Sheets

DISPLACEMENT CORRECTION DEVICE, DISPLACEMENT CORRECTION METHOD, AND IMAGE FORMING DEVICE

CROSS-REFERENCE TO RELATED APPLICATIONS

The present application claims priority to and incorporates by reference the entire contents of Japanese priority document, 2006-215735 filed in Japan on Aug. 8, 2006.

BACKGROUND OF THE INVENTION

1. Field of the Invention

The present invention relates to a displacement correction device and a method thereof, and an image forming device preferably used in a tandem-type color image forming device where a plurality of image stations per a color that execute an image forming process are provided and a color image for a transfer formed by superimposing images of each color on an endless transferring belt or a transporting belt is transferred onto a recording paper, thereby forming the color image.

2. Description of the Related Art

Conventionally, in a color image forming device employing an electrophotographic technology, a photoconductor drum as an image holding member is electrically charged by a charging unit, a latent image is formed on the charged photoconductor drum by irradiating the surface of the charged photoconductor drum with laser light depending on image information, and a developing unit develops the latent image. The developed toner image is then transferred onto a paper sheet or the like.

Tandem-type color image forming devices are well-known in the art. In a typical tandem-type color image forming device includes a plurality of image stations that execute such a series of image forming processes. Each of the image stations forms an image of a corresponding color of C (cyan), M (magenta), Y (yellow), and BK (black) on a corresponding one the image holding member and the color image for a transfer formed by superimposing images of each color on an endless transferring belt is transferred onto a recording paper, thereby forming the color image.

In this tandem-type color image forming device, when the image is formed on the photoconductor drum of each color and transferred onto the recording paper on the transferring belt, if a transferred image position of each color is displaced from an ideal position, the image having a color drift is formed and quality of the image deteriorates.

Generally, a displacement correction pattern image is formed on the transferring belt to be detected by a charged coupled device (CCD) sensor or the like and the displacement on the photoconductor drum corresponding to the image of each color is detected and an electric correction is performed to an image signal to be recorded, and a reflecting mirror provided in a light path of the laser light is driven to correct a light path length or a light path change. Japanese Patent No. 2642351 discloses a method for achieving this. The displacement correction pattern image is a line-shaped pattern of a toner in each color of Y, M, C, and BK. This method includes measuring a time when the pattern of other color is detected by the sensor, by making a pattern of one certain color a reference, and calculating how much a position of other pattern calculated from the time and transporting speed of the transporting belt is displaced from a theoretical value to obtain the displacement amount.

Japanese Patent Application Laid-Open No. H6-193476 discloses a method to image-form plural sets of the patterns-for-displacement-correction in a sub-scanning direction (in a longitudinal direction) of the transporting belt relative each color and to average the displacement amount per a set, thereby eliminating fluctuation of the displacement amount due to a rotation periodic fluctuation of the photoconductor drum. In this method, however, the primary time cannot be inserted between the sets, due to environmental changes or a tolerance in a layout or in a dimension of a portion where the displacement correction pattern is image-formed, detected in a design phase, for example, a stretch of the transferring belt, an incident sometimes occurs where positional information on the correction pattern cannot be detected.

SUMMARY OF THE INVENTION

It is an object of the present invention to at least partially solve the problems in the conventional technology.

According to an aspect of the present invention, there is provided a displacement correction device for use in a color image forming device. The displacement correction device includes a rotating unit that rotates an endless member; an image forming unit corresponding to each of a plurality of colors that sequentially forms on the rotating endless member a displacement correction pattern image having a line-shaped pattern in a corresponding color; a pattern detecting unit that detects the displacement correction patterns on the rotating endless member; a storage unit that stores therein detection execution timing information for setting a detection execution timing at which the pattern detecting unit is to detect the displacement correction patterns depending on a tolerance in a layout and a dimension of at least one of the image forming unit, the pattern detecting unit, and the endless member; a controlling unit that controls the pattern detecting unit to detect the displacement correction patterns based on the detection execution timing information stored in the storage unit; and an updating unit that updates the detection execution timing information stored in the storage unit when the detection execution timing information differs from a reference timing.

According to another aspect of the present invention, there is provided an image forming device comprising a displacement correction device. The displacement correction device including a rotating unit that rotates an endless member; an image forming unit corresponding to each of a plurality of colors that sequentially forms on the rotating endless member a displacement correction pattern image having a line-shaped pattern in a corresponding color; a pattern detecting unit that detects the displacement correction patterns on the endless member; a storage unit that stores therein detection execution timing information for setting a detection execution timing at which the pattern detecting unit is to detect the displacement correction patterns depending on a tolerance in a layout and a dimension of at least one of the image forming unit, the pattern detecting unit, and the endless member; a controlling unit that controls the pattern detecting unit to detect the displacement correction patterns based on the detection execution timing information stored in the storage unit; and an updating unit that updates the detection execution timing information stored in the storage unit when the detection execution timing information differs from a reference timing.

According to still another aspect of the present invention, there is provided a displacement correction method including sequentially forming on a rotating endless member a displacement correction pattern having a line-shaped pattern for each of a plurality of colors by use of a corresponding one of image forming units; detecting the displacement correction patterns on the rotating endless member by use of a pattern detecting unit; setting detection execution timing information for setting a detection execution timing at which the pattern detecting unit is to detect the displacement correction patterns depending on a tolerance in a layout and a dimension of at least one of the image forming unit, the pattern detecting unit, and the endless member, by reading the detection execution timing information from a storage unit; and updating the detection execution timing information stored in the storage unit when the detection execution timing information differs from a reference timing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained with reference to the drawings.

Figure 1:
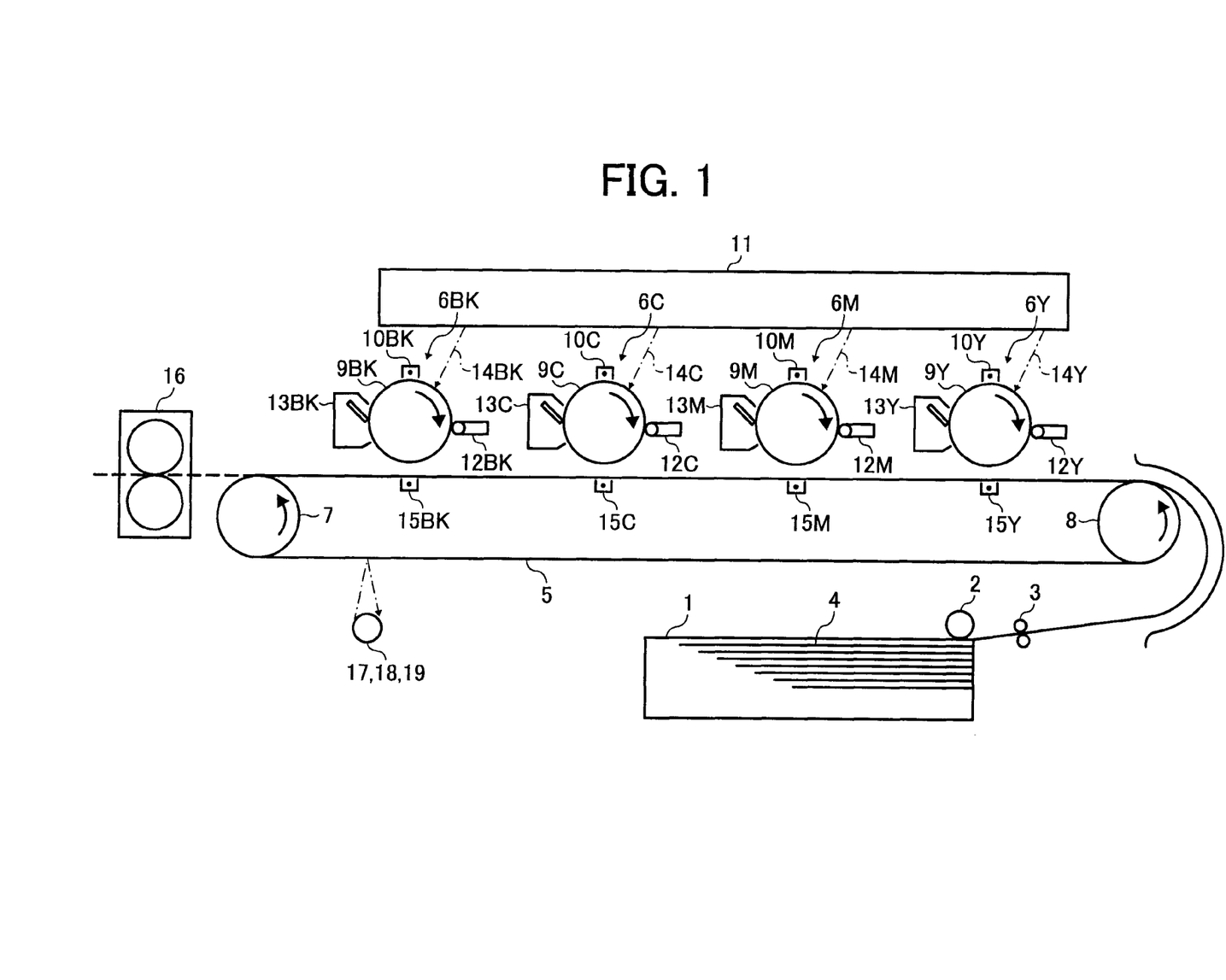
FIG. 1 is a schematic diagram of a color image forming device according to a first embodiment of the present invention.

FIG. 1 is a schematic diagram of a color image forming device according to a first embodiment of the present invention. In this color image forming device is a tandem type, i.e., an image forming unit of each color is arranged along a transporting belt (endless transporting unit). A plural image forming units (electrophotography processing units) 6Y, 6M, 6C, and 6BK are arranged along a transporting belt 5 that transports a paper (recording paper) 4 separated and fed by a feeding roller 2 and a separating roller 3 from a feeding tray 1 in the order from an upstream side in a transporting direction of the transporting belt 5.

The image forming units 6Y, 6M, 6C, and 6BK are common in their internal configurations except in that colors of toner images to be formed are different. The image forming unit 6Y forms the toner image in yellow, the image forming unit 6M forms the toner image in magenta, the image forming unit 6C forms the toner image in cyan, and the image forming unit 6BK forms the toner image in black, respectively. The image forming unit 6Y will be specifically explained in the following explanation. However, because other image forming units 6M, 6C, and 6BK are the same as the image forming unit 6Y, the explanation of each component of the image forming units 6M, 6C, and 6BK is limited such that reference numbers discriminated by M, C, and BK are indicated in Figs in place of Y appended to each component of the image forming unit 6Y, and the explanation will be omitted.

The transporting belt 5 is an endless (endless) belt wound around a driving roller 7 and a driven roller 8 that are rotated and driven. The driving roller 7 is rotated and driven by a driving motor (not shown). The driving motor, the driving roller 7, and the driven roller 8 function as a driving unit that rotates the transporting belt 5 that is the endless transporting unit.

In forming images, the paper 4 accommodated in the feeding tray 1 is fed in the order from one stacked at the top and is absorbed on the transporting belt 5 by an electrostatic absorption to be transported to the first image forming unit 6Y. The toner image in yellow is transferred.

The image forming unit 6Y includes a photoconductor drum 9Y, a charger 10Y placed around the photoconductor drum 9Y, an exposing instrument 11, a developing instrument 12Y, a photoconductor cleaner 13Y, a static eliminator or the like (not shown). The exposing instrument 11 is configured so as to emit laser light 14Y, 14M, 14C, and 14BK that are exposing light corresponding to the color of the toner image that each of image forming units 6Y, 6M, 6C, and 6BK forms.

In forming images, an outer circumferential surface of the photoconductor drum 9Y is exposed by the laser light 14Y corresponding to a yellow image from the exposing instrument 11 after being evenly charged by the charger 10Y in the dark, and an electrostatic latent image is formed. The developing instrument 12Y visualizes (develops) the electrostatic latent image using the toner in yellow. As a result, the toner image in yellow is formed on the photoconductor drum 9Y.

This toner image is transferred onto the paper 4 at a position where the photoconductor drum 9Y contacts with the paper 4 on the transporting belt 5 (transferring position) by an operation of a transferring instrument 15Y. By this transfer, the toner image in yellow is formed on the paper 4. The static eliminator eliminates the static of the photoconductor drum 9Y that has finished the transfer of the toner image after unnecessary toner, which remains on the outer circumferential surface, is cleaned by the photoconductor cleaner 13Y. The photoconductor drum 9Y stands by to form the next image forming.

As explained above, the paper 4, onto which the toner image in yellow has been transferred at the image forming unit 6Y, is transported to the next image forming unit 6M by the transporting belt 5. At the image forming unit 6M, a toner image in magenta is formed on a photoconductor drum 9M through a process similar to the image forming process at the image forming unit 6Y. The toner image is superimposed on the image in yellow formed on the paper 4 to be transferred.

The paper 4 is further transported to the next image forming units 6C, 6BK. Through similar operations, a toner image in cyan formed on a photoconductor drum 9C and a toner image in black formed on a photoconductor drum 9BK are superimposed on the paper 4 to be transferred. In this manner, a full-color image is formed on the paper 4. The paper 4, on which the full-color superimposed image is formed, is separated from the transporting belt 5, and the image is fixed at a fixing equipment 16. Then, the paper 4 is ejected outside the image forming device.

In a color image forming device configured as explained above, the toner image in each color may not be superimposed at a position where it must be superimposed under normal circumstances and a displacement may occur between each color due to an error in a center distance between the photoconductor drums 9Y, 9M, 9C, and 9BK, a parallelism error between the photoconductor drums 9Y, 9M, 9C, and 9BK, an installation error in a deflecting mirror (not shown) that deflects the laser light in the exposing instrument 11, a timing error in writing the static latent image to the photoconductor drums 9Y, 9M, 9C, and 9BK or the like. A skew, a resist displacement in a sub-scanning direction, a magnification ratio error in a main scanning direction, a resist displacement in the main scanning direction or the like are mainly known as factors of such displacement of each color.

In the present embodiment, plural sets of patterns-for-displacement-correction are regularly arranged in the sub-scanning direction (in the transporting direction) on the transporting belt 5 to image-form, and sensors 17, 18, and 19 opposite to the transporting belt 5 are placed at a downstream side of the image forming unit 6BK to detect the displacement correction pattern, and using the displacement from an ideal position, the skew, the resist displacement in the sub-scanning direction, the magnification ratio in the main scanning direction, and the resist displacement amount in the main scanning direction are respectively obtained. The correction is performed based on the displacement amount. Regarding the skew, for example, an inclination is added to the deflecting mirror in the exposing instrument 11 or the exposing instrument 11 itself using an actuator. Regarding the resist displacement in the sub-scanning direction, for example, a writing-out timing of a line and a surface phase of the deflecting mirror are controlled. Regarding the magnification ratio in the main scanning direction, for example, a writing image frequency is changed. Regarding the resist displacement in the main scanning direction, for example, a writing-out timing of a main scanning line is corrected.

Figure 2:
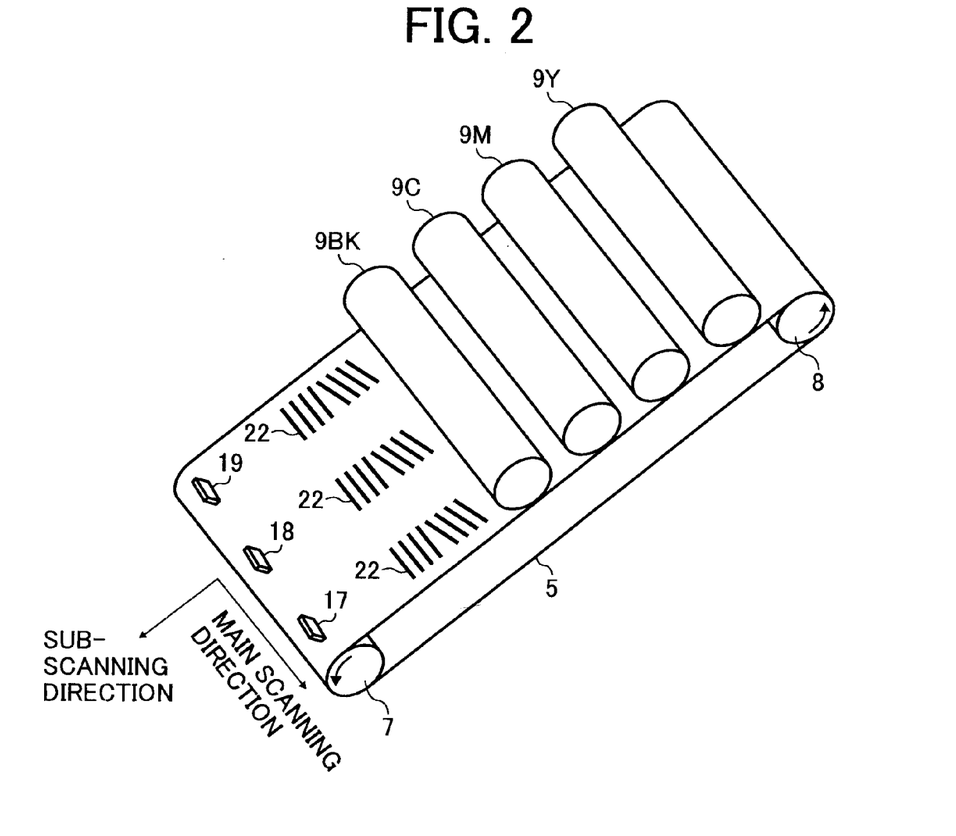
FIG. 2 is a perspective view of a transferring belt, photoconductor drums, and sensors shown in FIG. 1.

FIG. 2 is a perspective view of the transporting belt 5, the photoconductor drums 9Y, 9M, 9C, and 9BK, and the sensors 17, 18, and 19, and depicts a situation where patterns-for-displacement-correction 22 have been image-formed on the transporting belt 5. The sensors 17, 18, and 19 are supported on a same substrate (not shown) so as to be placed along the main scanning direction perpendicular to the transporting direction of the paper 4. The displacement correction pattern 22 is formed per a line at a starting side, a central unit, and a termination side in the main scanning direction corresponding to the sensors 17, 18, and 19.

Figure 3:
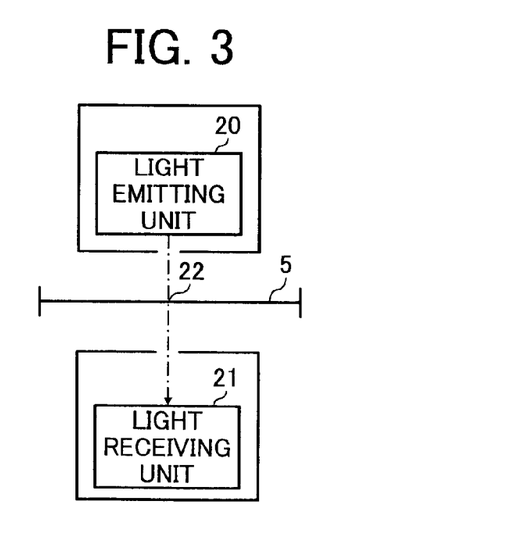
FIG. 3 is a schematic diagram of the sensor shown in FIG. 1.

Each of the sensors 17, 18, and 19 includes a light emitting unit 20 and a light receiving unit 21 as shown in FIG. 3 and receives the light emitted from the light emitting unit 20 and reflected at the displacement correction pattern 22 at the light receiving unit 21 to convert the light into an electric signal.

Figure 4:
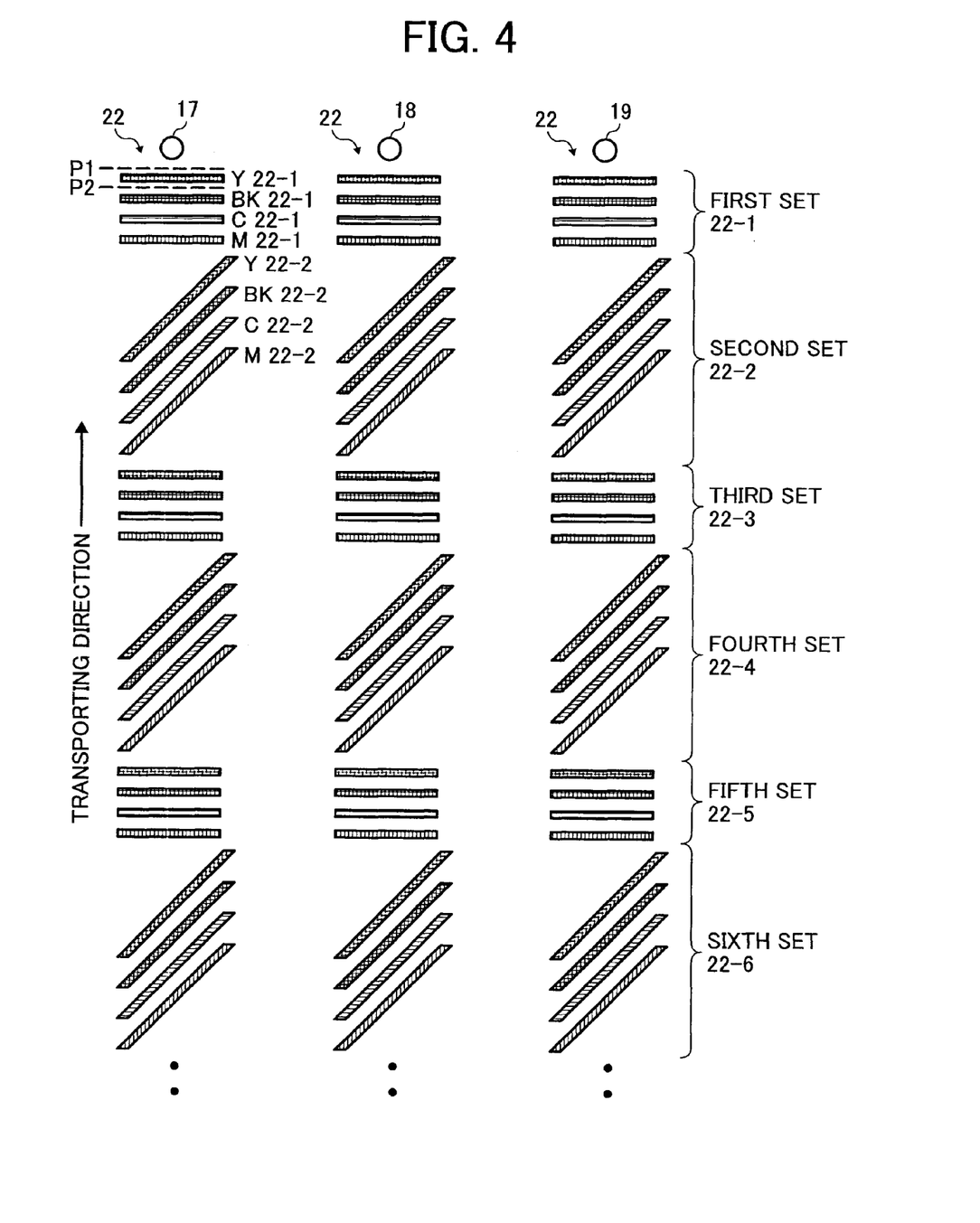
FIG. 4 is a schematic diagram of a displacement correction pattern image according to the first embodiment.

The displacement correction pattern 22 in each line includes, as its plan view is depicted in FIG. 4, odd-numbered (first, third, fifth or the like) sets 22-1, 22-3, 22-5 or the like where straight lines elongating parallel to the main scanning direction are image-formed in the order of Y, BK, C, and M in the sub-scanning direction and even-numbered (second, forth, sixth or the like) sets 22-2, 22-4, 22-6 or the like where straight lines elongating obliquely to the main scanning direction are image-formed between the odd-numbered sets in the order of Y, BK, C, and M in the sub-scanning direction. The displacement correction pattern of one odd-numbered set and of the next even-numbered set is paired. The pair of detected signals allows the skew, the resist displacement in the sub-scanning direction, the magnification ratio in the main scanning direction, and the resist displacement in the main scanning direction to be respectively obtained. Therefore, as shown in FIG. 2, to offset a fluctuation error due to a rotational fluctuation of the photoconductor drums 9Y, 9M, 9C, and 9BK, the transporting belt 5 or the like, a pattern array for the displacement correction having the sets of the patterns-for-displacement-correction is formed relative to one set distance of the photoconductor drum, and the sensors 17, 18, and 19 read the pattern array for the displacement correction, and a result of the reading is averaged in the sub-scanning direction, thereby allowing more precise correction. It should be noted that because a publicly known method (refer to Japanese Patent No. 2642351, Japanese Patent Application Laid-Open No. 2005-289035) can be employed regarding a specific calculation method of the displacement amount, an explanation will be omitted.

Figure 5:
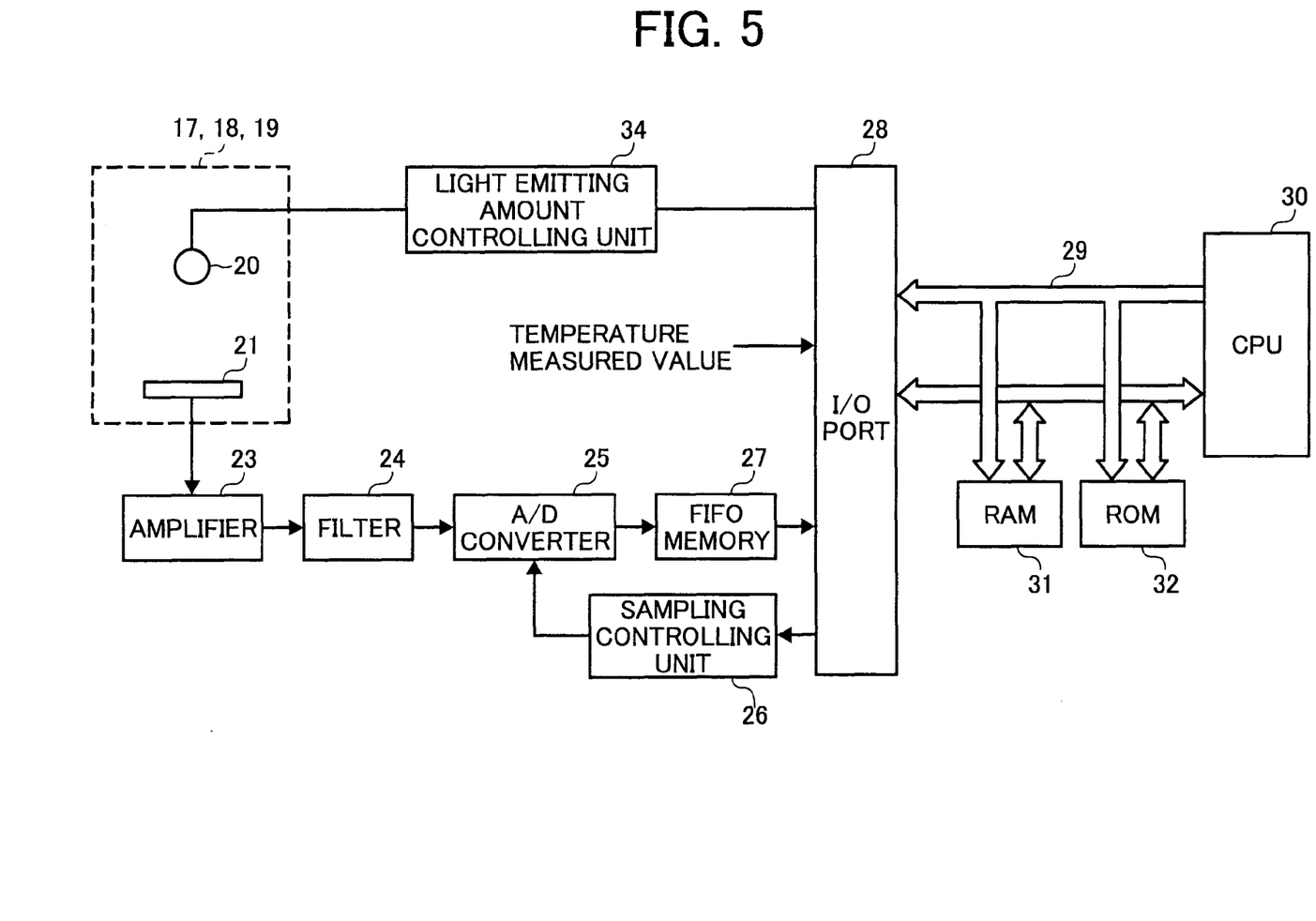
FIG. 5 is a block diagram of a displacement amount calculating device.

Based on the detected signal by the sensors 17, 18, and 19 of the displacement correction pattern 22 as shown in FIG. 4, FIG. 5 depicts an electrical block of the device that obtains the displacement amount of each color. The electrical block includes a central processing unit (CPU) 30 mutually connected with a data bus 29, a random access memory (RAM) 31, a read only memory (ROM) 32 (including a rewritable flash memory unit), and an input output (I/O) port 28, a unit that controls the light emitting amount from the light emitting unit 20 of the sensors 17, 18, and 19 (a light emitting amount controlling unit 34), each of which is connected with the I/O port 28, a unit that loads the detected signal at the light receiving unit 21 of the sensors 17, 18, and 19 (an amplifier 23, a filter 24, an analog digital (A/D) converter 25, a sampling controlling unit 26, and a first in first out (FIFO) memory 27).

The amplifier 23 amplifies the detected signal of the displacement correction pattern obtained from the light receiving unit 21. The filter 24 passes only a signal component (an edge component in the sub-scanning direction) of the line detection. The A/D converter 25 converts the signal component from analog data into digital data. The sampling controlling unit 26 controls a timing of the sampling of the digital data at the A/D converter 25. The FIFO memory 27 stores the sampled data. The stored data is read out at a predetermined timing. The CPU 30 loads the stored data to the RAM 31 via the I/O port 28 and the data bus 29. The CPU 30 executes a predetermined calculation process to calculate positional information to obtain the various displacement amount.

The ROM 32 stores various programs and data for controlling the displacement correction and the image forming according to the present embodiment including the programs for calculating the various displacement amount. As will be explained later, depending on a tolerance in a layout (placement position) of the image forming units 6Y, 6M, 6C, and 6BK, a tolerance in a layout of the sensors 17, 18, and 19, an elongation characteristic relative to temperature of the transporting belt 5, the flash memory unit, which is one part of the ROM 32, stores detection execution timing information for setting detection execution timings (a detection start timing, a detection termination timing) of the sensors 17, 18, and 19 such that the displacement correction pattern of each set shown in FIG. 4 is detected at a predetermined reference timing. The CPU 30 monitors the detected signal from the light receiving unit 21 at an adequate timing and controls the light emitting amount using the light emitting amount controlling unit 34 such that a level of light-received signals from the light receiving unit 21 is kept constant at all times to be capable of surely detecting any degradation of the transporting belt 5 and of the light emitting unit 20. The CPU 30 receives a measured value from a temperature sensor (not shown) that measures the temperature of air inside or surrounding the image forming device via the I/O port 28 and the data bus 29 to set the detection execution timing of the sensors 17, 18, and 19 corresponding to the measured value. In this manner, the CPU 30 and the ROM 32 function as a controlling unit that controls the operation of the entire image forming device.

An operation of the device shown in FIG. 5 will be explained. The device is configured so as to be capable of controlling the plural types of displacement corrections corresponding to settings. Hereinafter, those are referred to as a first to a third displacement correction controlling procedures, and will be explained using flowcharts in FIGS. 6 to 8. In the following explanation, the displacement correction pattern 22 shown in FIG. 4 shall be formed on the transporting belt 5.

Figures 6, 6A:
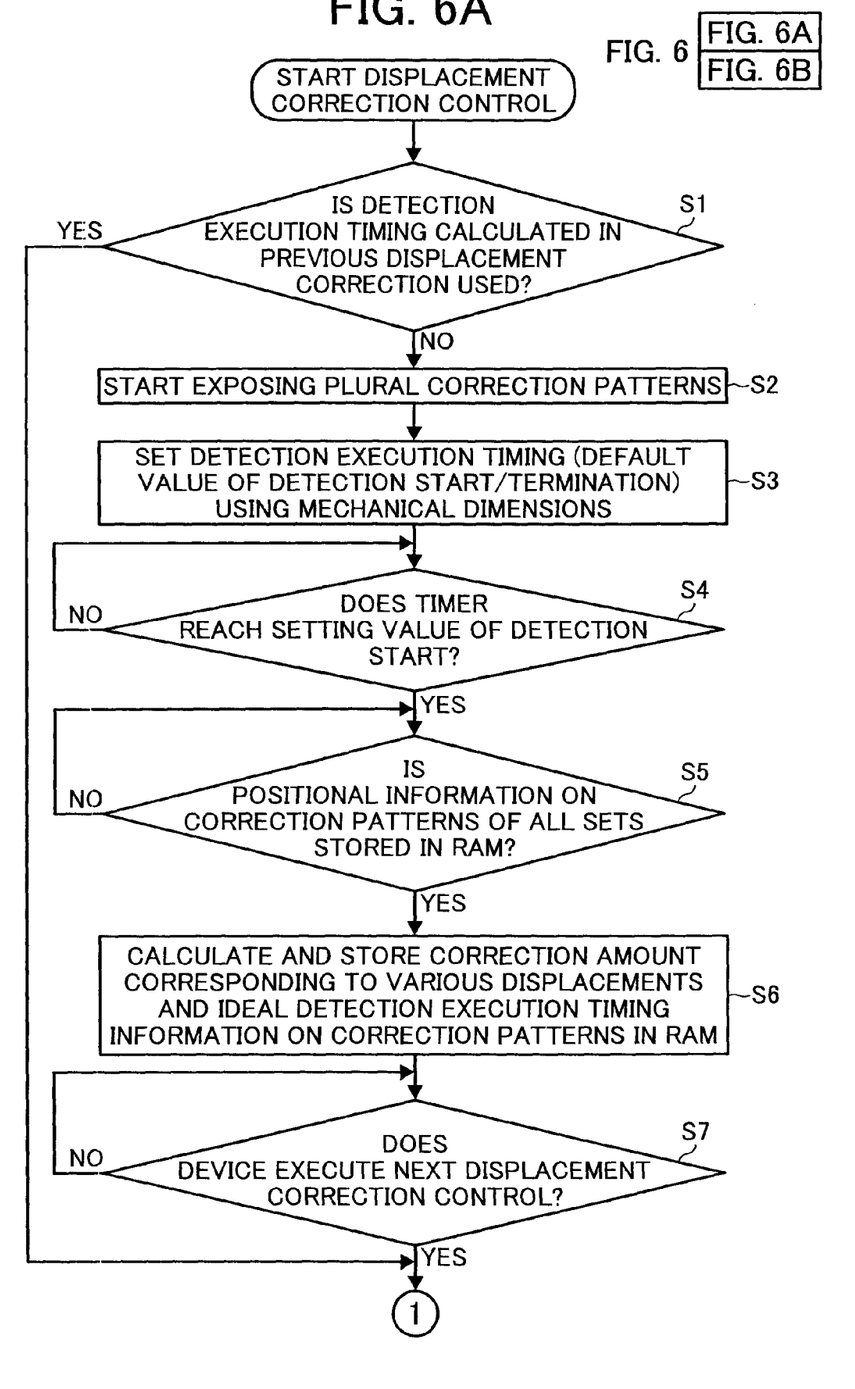
FIG. 6 is a flowchart of a first displacement correction control procedure according to the first embodiment.
Figure 6B:
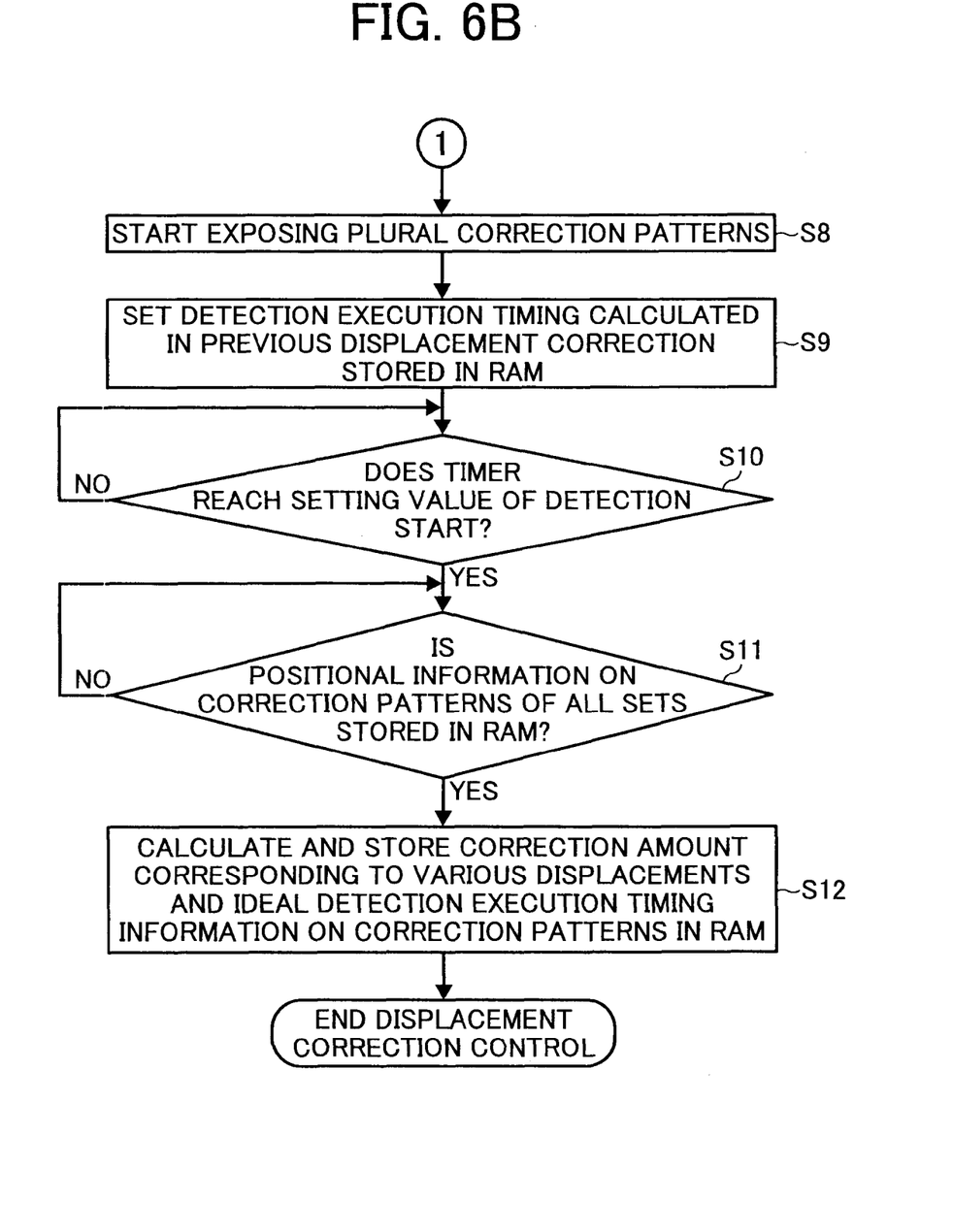

FIG. 6 depicts the first displacement correction controlling procedure. The CPU 30 firstly determines whether the detection execution timing information calculated at the time of the previous displacement correction is used (Step S1). At the time of the first displacement correction (when a major change occurs such as immediately after being assembled in a factory, at the time of a part replacement), the CPU 30 moves to Step S2, and to form a pattern of Y 22-1Y of the first set 22-1 of the displacement correction pattern 22 on the transporting belt 5, the device emits the laser light 14 onto the photoconductor drum 9Y at the image forming unit 6Y to start the exposure (Step S2) and forms the toner image of Y to transfer this toner image onto the transporting belt 5 using the transferring instrument 15Y. Subsequently, following a rotation of the transferring unit 15Y, a pattern-of-magenta 22-1M, a pattern-of-cyan 22-1C, a pattern-of-black-22-1 for the displacement correction of the first set, a pattern-of-yellow 22-2Y, a pattern-of-magenta 22-2M, a pattern-of-cyan 22-2C, a pattern-of-black 22-2BK for the displacement correction of the second set or the like are sequentially formed on the transporting belt 5 as shown in FIG. 4.

The device reads out a default value of the detection execution timing (detection start timing, detection termination timing) of the displacement correction pattern-of-yellow 22-1Y from the flash memory unit in the ROM 32 while starting the exposure of the photoconductor drum 9Y, and starts timer, which is not shown, while setting it to the timer (Step S3). In consideration of the tolerance in the layout (placement tolerance) of the image forming unit 6Y and the tolerance in the layout of the sensors 17, 18, and 19, the default value is set linked to transporting speed of the transporting belt 5 such that the predetermined reference timing, for example, the displacement correction pattern 22-1Y is detected at a substantially middle timing of the detection execution timing. In the present embodiment, a time, when a position in the sub-scanning direction a little bit ahead of the pattern-of-Y 22-1Y at a forehand of the displacement correction pattern 22-1 of the first set formed on the transporting belt 5 (P1 in FIG. 4) is expected to arrive at installation places of the sensors 17, 18, and 19, is set as the detection start timing, and a time, when a position in the sub-scanning direction intermediate between the pattern 22-1Y and the successive pattern 22-M (P2 in FIG. 4) is expected to arrive at the installation places of the sensors 17, 18, and 19, is set as the detection termination timing. In this manner, after setting the detection start timing and the detection termination timing of the displacement correction pattern of-yellow 22-1Y, the detection execution timing of the displacement correction pattern of each color of each set is set to the timer in a similar way.

At the time of the detection start timing of the displacement correction pattern 22-1Y, that is, the time when the position of P1 in FIG. 4 is expected to arrive at the installation places of the sensors 17, 18, and 19 (YES at Step S4), the device emits the light at the light emitting unit 20 of the sensors 17, 18, and 19 and starts the monitoring of an output signal from the light receiving unit 21. When the displacement correction pattern 22-1Y is detected, the device stores the data in the FIFO memory 27 and saves the stored data in the RAM 31 via the I/O port 28 and the data bus 29 by use of the CPU 30. The positional information to be saved in the RAM 31 is a count value of the timer at the time when the displacement correction pattern 22-1Y is detected (the timer set at the time of setting the detection execution timing of the displacement correction pattern 22-1Y) or positional data of the displacement correction pattern 22-1Y relative to a predetermined reference position of the transporting belt 5 calculated based on the count value and the transporting speed of the transporting belt 5.

At the time of the detection termination timing of the displacement correction pattern 22-1Y, that is, the time when the position of the P2 in FIG. 4 is expected to arrive at the installation positions of the sensors 17, 18, and 19, the device stops the light emission at the light emitting unit 20 and the monitoring of the output signal from the light receiving unit 21.

At the time of the detection start timing of the displacement correction pattern 22-1BK, the device makes the light emitting unit 20 of the sensors 17, 18, and 19 emit the light again and starts the monitoring of the output signal from the light receiving unit 21. When a clearance between the displacement correction pattern 22-1Y and the displacement correction pattern 22-1BK is narrow, even at the timing of the detection termination timing of the displacement correction pattern 22-1Y, the device may not stop the light emission from the light emitting unit 20 and the monitoring of the output signal from the light receiving unit 21, but may continue them. When the displacement correction pattern 22-1BK is detected, the device stores the data in the FIFO memory 27 and saves the stored data in the RAM 31 via the I/O port 28 and the data bus 29 by use of the CPU 30. Subsequently, the device saves the positional information on the patterns-for-displacement-correction of Y, BK, C, and M of all sets in the RAM 31 in a similar way.

After saving the positional information on the patterns-for-displacement-correction of each color of all sets (YES at Step S5), the device calculates various patterns-for-displacement-correction based on the positional information and saves them in the RAM 31. The device calculates a difference between the detection timing of the displacement correction pattern of a reference image-form color of each set and the ideal value (the reference timing, because this is the first displacement correction control) and adds the difference to the detection execution timing information stored in the flash memory unit in the ROM 32, thereby calculating the ideal detection execution timing information to save it in the RAM 31. The reference image-form color pattern is one formed at a farthest position from the sensors 17, 18, and 19 and is one of Y in the present embodiment. The reason of selecting the pattern formed at the farthest position is that due to the placement of all the image forming units 6M, 6C, and 6BK of other colors between the image forming unit 6Y, which forms the pattern of Y, and the sensors 17, 18, and 19, all those tolerances or the like effect on the displacement from the ideal position of the positional information on the displacement correction pattern, whereby based on the displacement amount, the pattern formed at the farthest position is available for the rotation control of the photoconductor drums 9Y, 9M, 9C, and 9BK, transportation control of the transporting belt 5. It should be noted that in calculating the ideal detection execution timing information of each set, the difference per a set may be added to the detection execution timing information per a set or may be configured so as to calculate the ideal detection execution timing information on all sets using the difference of a certain set.

When the device executes the next displacement correction control (YES at Step S7), as similar to Step S2, the device sequentially forms the patterns-for-displacement-correction of all sets are on the transporting belt 5 (Step S8).

The device sets the detection execution timing (the detection start timing, the detection termination timing) of the displacement correction pattern-of-yellow 22-1Y of the first set to the timer that is not shown (Step S9). A setting value of the timer is based on the ideal detection execution timing information saved in the RAM 31 in Step S6. Similarly, the device sets the detection execution timing of the displacement correction pattern of each color of each set to the timer.

Subsequently, in a similar manner to Steps S3 to S6, when the timer reaches the setting value (YES at Step S10), the device detects the displacement correction pattern of each color of all sets to save them in the RAM 31 (Step S11). Based on these positional information, the device calculates various displacement correction amount to save them in the RAM 31. The device calculates the difference between the detection timing of the displacement correction pattern of the reference image-form color of each set and the ideal value (the substantially middle timing of the ideal detection execution timing calculated in Step S6) and adds the difference to the ideal detection execution timing information calculated in Step S6, thereby updating (modifying) the ideal detection execution timing information to save it in the RAM 31 (Step S12).

As explained above, according to the first displacement correction controlling procedure, depending on the tolerance in the layout of the image forming units 6Y, 6M, 6C, and 6BK, the tolerance in the layout of the sensors 17, 18, and 19, the elongation characteristic relative to temperature of the transporting belt 5 or the like, the device has preliminary stored in the flash memory unit in the ROM 32 the detection execution timing information for setting the detection execution timing (the detection start timing, the detection termination timing) of the sensors 17, 18, and 19 such that the displacement correction pattern of each set is detected at the predetermined reference timing, and when the first displacement correction control is executed, the device sets the detection execution timing of the sensors 17, 18, and 19 making the detection execution timing information the default value, and when the second or later displacement correction control is executed, depending on the difference between the detection timing of the displacement correction pattern of reference image-form color detected at the time of executing the previous displacement correction control and its ideal value, the device modifies the previous detection execution timing information and executes the displacement correction control based on the modified detection execution timing information, thereby being capable of unfailingly detecting the patterns-for-displacement-correction of all sets, even when there is an environmental changes, the tolerance in the layout or a dimension of a portion where the displacement correction pattern is image-formed, detected in a design phase.

Figure 7A:
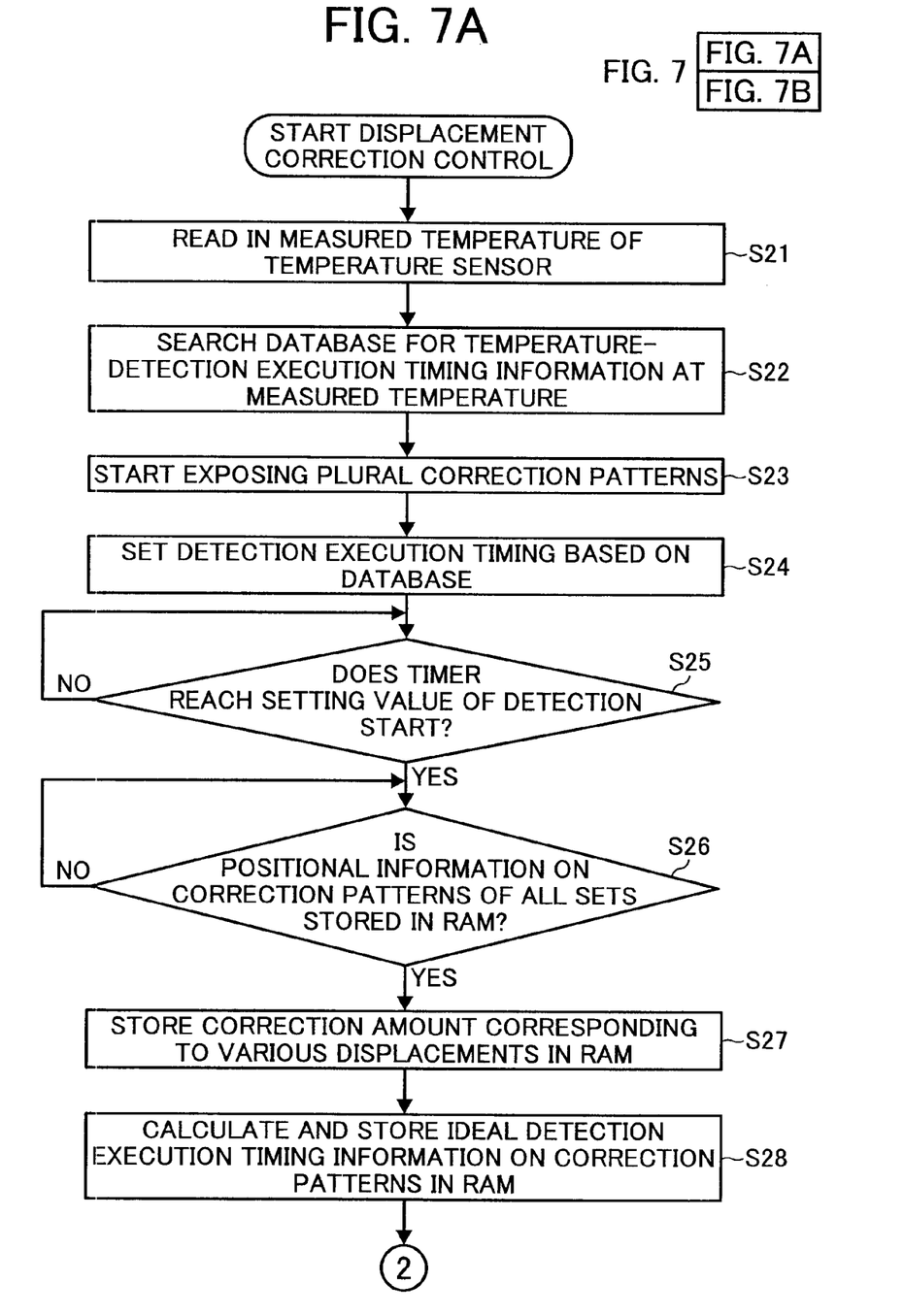
FIG. 7 is a flowchart of a second displacement correction control procedure according to the first embodiment.
Figure 7B:
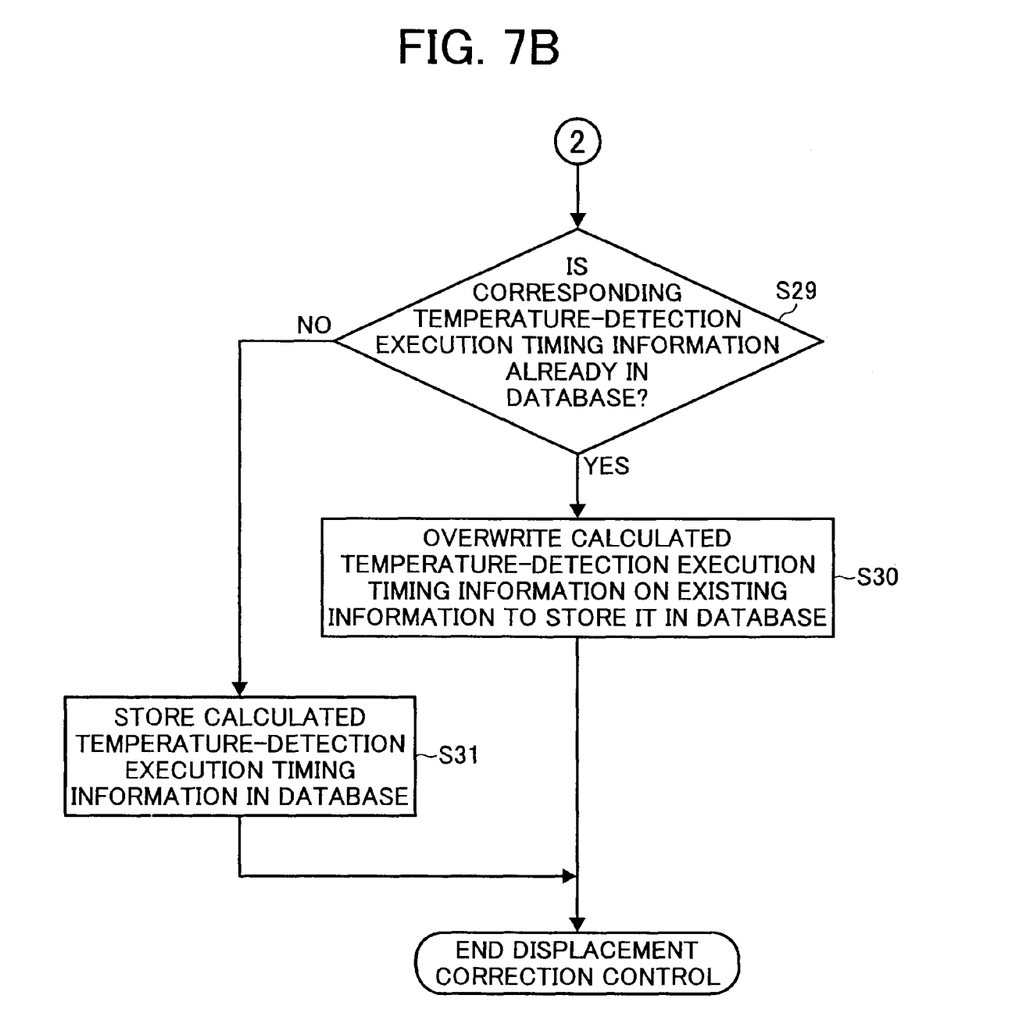

FIG. 7 is a flowchart of a second displacement correction controlling procedure. In the second displacement correction controlling procedure, compared with the first displacement correction controlling procedure, the difference is that when the device executes the first displacement correction control, the device sets a value depending on temperature measured by an unshown temperature sensor as the detection execution timing information set to the timer by default. Regarding this timing information, the flash memory unit in the ROM 32 or a database formed in an unshown hard disk or the like saves values relative to a plurality of temperatures (e.g. 20 degrees centigrade, 25 degrees centigrade, 30 degrees centigrade, 35 degrees centigrade). That is, pieces of detection execution timing information, which make the temperature a discrete variable, are saved. The temperature sensor is placed so as to be capable of measuring the temperature of the air surrounding the transferring belt 5 inside the image forming unit (except a vicinity of a device that generates heat such as the fixing instrument 16 and a place where the temperature is unstable) or the temperature of the air surrounding the image forming device. Because the temperature of the air inside the image forming device has a relation with the temperature of the air surrounding the image forming device, the timing information relating to either inside the image forming device or its surround is saved in the database and a conversion formula between the relations with another is saved, whereby in the image forming device having a temperature gauge that measures the temperature of either one or another, the device can execute the following processes.

The CPU 30 reads in the measured value in the temperature sensor (Step S21) to search in the database and obtains the detection execution timing information (temperature-detection execution timing information) relative to the measured value of the temperature, and retains it in the RAM 31 (Step S22). At this time, when the detection execution timing information relative to the measured value of the temperature is not present in the database, the CPU 30 obtains the detection execution timing information relative to the temperature nearest to the measured value of the temperature as an approximate value. That is, for example, when the measured temperature is 23 degrees centigrade, the CPU 30 obtains the detection execution timing information relative to 25 degrees centigrade.

In a similar manner to Step S2 in FIG. 6, the device sequentially image-forms the patterns-for-displacement-correction of all sets on the transporting belt 5 (Step S23) and sets to the timer as the default value the detection execution timing (the detection start timing, the detection termination timing) of each color of each set read out from the database and retained in the RAM 31 (Step S24).

In a similar manner to Steps S4 and S5 in FIG. 6, the device detects the displacement correction pattern of each color of each set to save the positional information in the RAM 31 (Steps S25, S26). In a similar manner to Step S6 in FIG. 6, the device calculates the various displacement correction amount based on these positional information to save it in the RAM 31 (Step S27). The device calculates the difference between the detection timing of the displacement correction pattern of the reference image-form color of each set and its ideal value to add this difference to the detection execution timing information stored in the flash memory unit in the ROM 32, thereby calculating the ideal detection execution timing information to save it in the RAM 31 (Step S28).

The CPU 30 determines whether the detection execution timing information relative to the measured temperature is already present in the database (Step S29). When it is present, in a form of overwriting the information, the device saves the ideal detection execution timing information saved in the RAM 31 in the database (Step s30). When it is not present, the device newly saves the detection execution timing information relative to the approximate value in the database (Step S31). Therefore, when the CPU 30 obtains the detection execution timing information relative to the measured value of the temperature in Step S22, the detection execution timing information relative to the temperature is updated, and when the CPU 30 obtains the approximate value in Step S22, the detection execution timing information relative to the approximate value is newly added to the database.

In this manner, according to the second displacement correction controlling procedure, because the device measures the temperature of the air inside or outside the image forming device and uses the detection execution timing information relative to the measured value of the temperature, even if the transporting belt 5 stretches due to the change in the environmental temperature of the image forming device, the device sets the detection execution timing of the displacement correction pattern depending on the stretch, thereby being capable of unfailingly detecting the displacement correction pattern, regardless of the change in the environmental temperature.

Figure 8A:
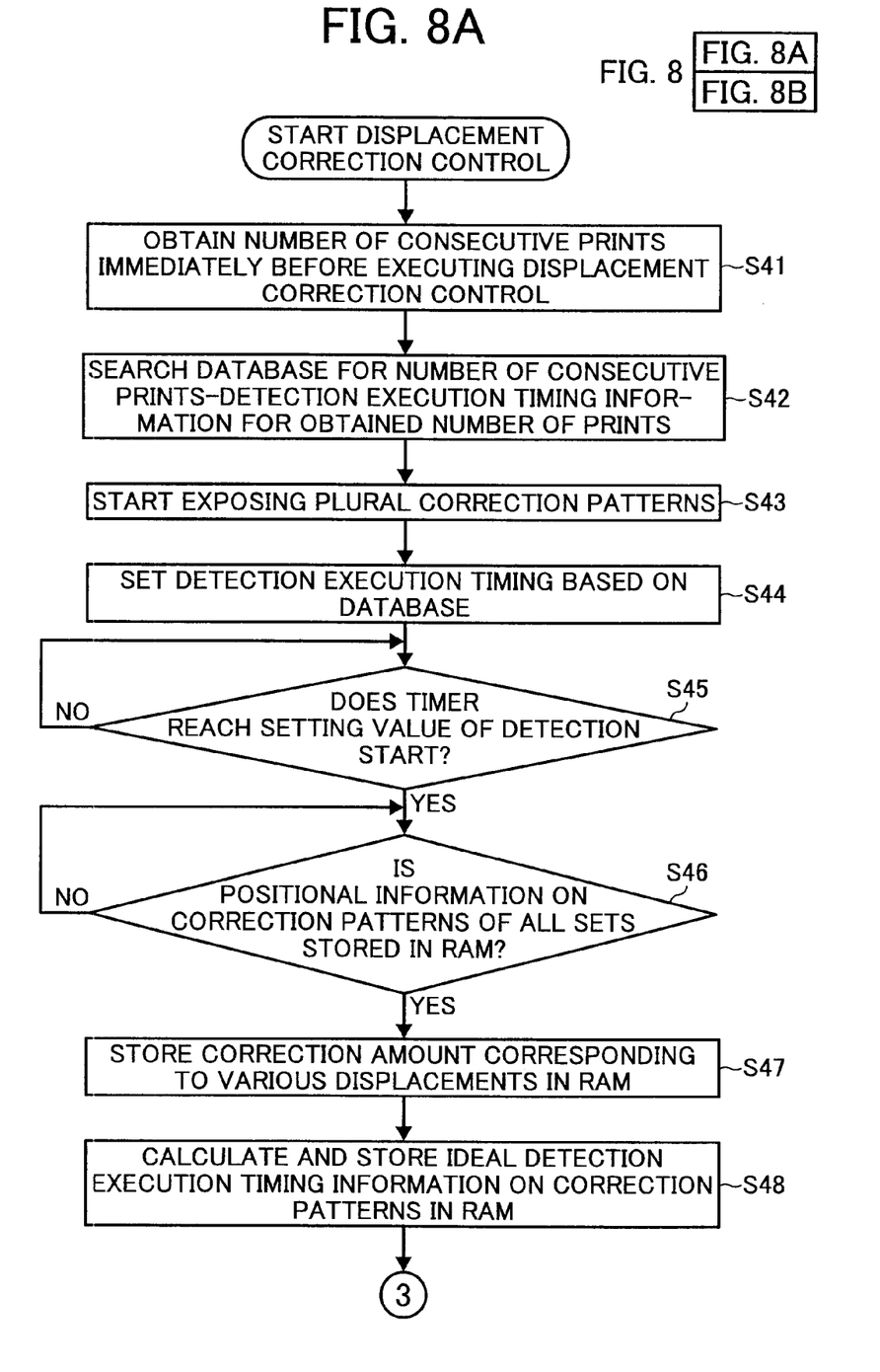
FIG. 8 is a flowchart of a third displacement correction control procedure according to the first embodiment.
Figure 8B:
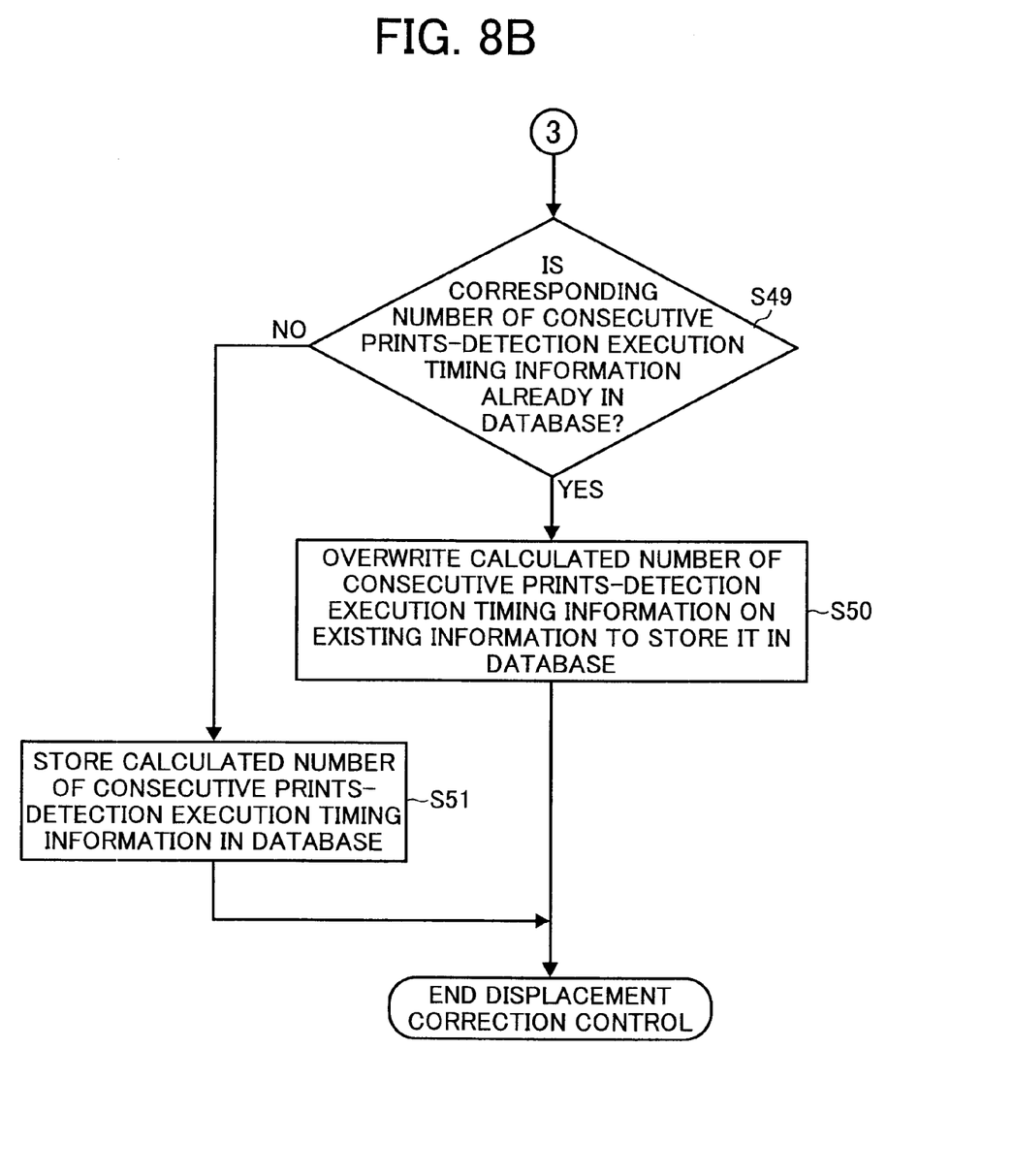

FIG. 8 is a flowchart of a third displacement correction controlling procedure. In the third displacement correction controlling procedure, compared with the second displacement correction controlling procedure, the difference is that in executing the first displacement correction control, the device sets a value depending on the count value of the number of consecutive prints immediately before the execution start of the displacement correction control as the detection execution timing to be set to the timer by default. Regarding this timing information, the flash memory unit in the ROM 32 or the database formed in the unshown hard disk saves values relative to the number of plural counts (e.g. 50, 100, and 150). That is, pieces of detection execution timing information, which make the number of the consecutive prints a discrete variable, are saved.

The CPU 30 obtains the number of the consecutive prints from the number of the consecutive prints counter (Step S41) and searches in the database to obtain the detection execution timing information (the number of the consecutive prints-detection execution timing information) relative to the obtained number of the consecutive prints and retains it in the RAM 31 (Step S42). At this time, when the detection execution timing information relative to the number of the consecutive prints is not present in the database, the CPU 30 obtains the detection execution timing information relative to the number of the consecutive prints nearest to the count value as the approximate value. That is, for example, when the number of the consecutive prints is 80, the CPU 30 obtains the detection execution timing information relative to 100.

In a similar manner to Step S2 in FIG. 6, the device sequentially image-forms the patterns-for-displacement-correction of all sets on the transporting belt 5 (Step S43) and sets to the timer as default value the detection execution timing (the detection start timing, the detection termination timing) of the displacement correction pattern of each color previously retained in the RAM 31 (Step S44).

In a similar manner to Steps S4 and S5 in FIG. 6, the device detects the displacement correction pattern of each color of each set and saves the positional information in the RAM 31 (Steps S45, S46). In a similar manner to Step S6 in FIG. 6, the device calculates the various displacement correction amount based on those positional information to save them in the RAM 31 (Step S47) and calculates the difference between the detection timing of the displacement correction pattern of the reference image-form color of each set and its ideal value to add this difference to the detection execution timing information stored in the flash memory unit in the ROM 32, thereby calculating the ideal detection execution timing information to save it in the RAM 31 (Step S48).

The CPU 30 determines whether the number of the consecutive prints-detection execution timing information in the number of the consecutive prints corresponding to the difference of the displacement correction pattern saved in the RAM 31 is already present in the database (Step S49). When it is present, in a form of overwriting the information, the device saves the ideal detection execution timing information saved in the RAM 31 in the database (Step S50). When it is not present, the device newly saves the number of the consecutive prints-detection execution timing information in the database (Step S51). Therefore, when the CPU 30 obtains the detection execution timing information relative to the count value of the number of the consecutive prints in Step S42, the detection execution timing information relative to the count value is updated, and when the CPU 30 obtains the approximate value in Step S42, the detection execution timing information relative to the approximate value is newly added to the database.

In this manner, according to the third displacement correction controlling procedure, the device uses the detection execution timing information corresponding to the count value of the number of the consecutive prints of the image forming device. However, because the number of the consecutive prints of the image forming device has a correlation with the temperature of the image forming units 6Y, 6M, 6C, and 6BK, which rise with the operation of the image forming device, the measured value of the temperature sensor can be replaced with by using the count value of the number of the consecutive prints. Therefore, even in the image forming device not having the temperature sensor, the device sets the detection execution timing of the displacement correction pattern depending on the stretch of the transporting belt 5 due to the change in the temperature following the operation of the image forming device, thereby being capable of unfailingly detecting the displacement correction pattern.

Figure 9:
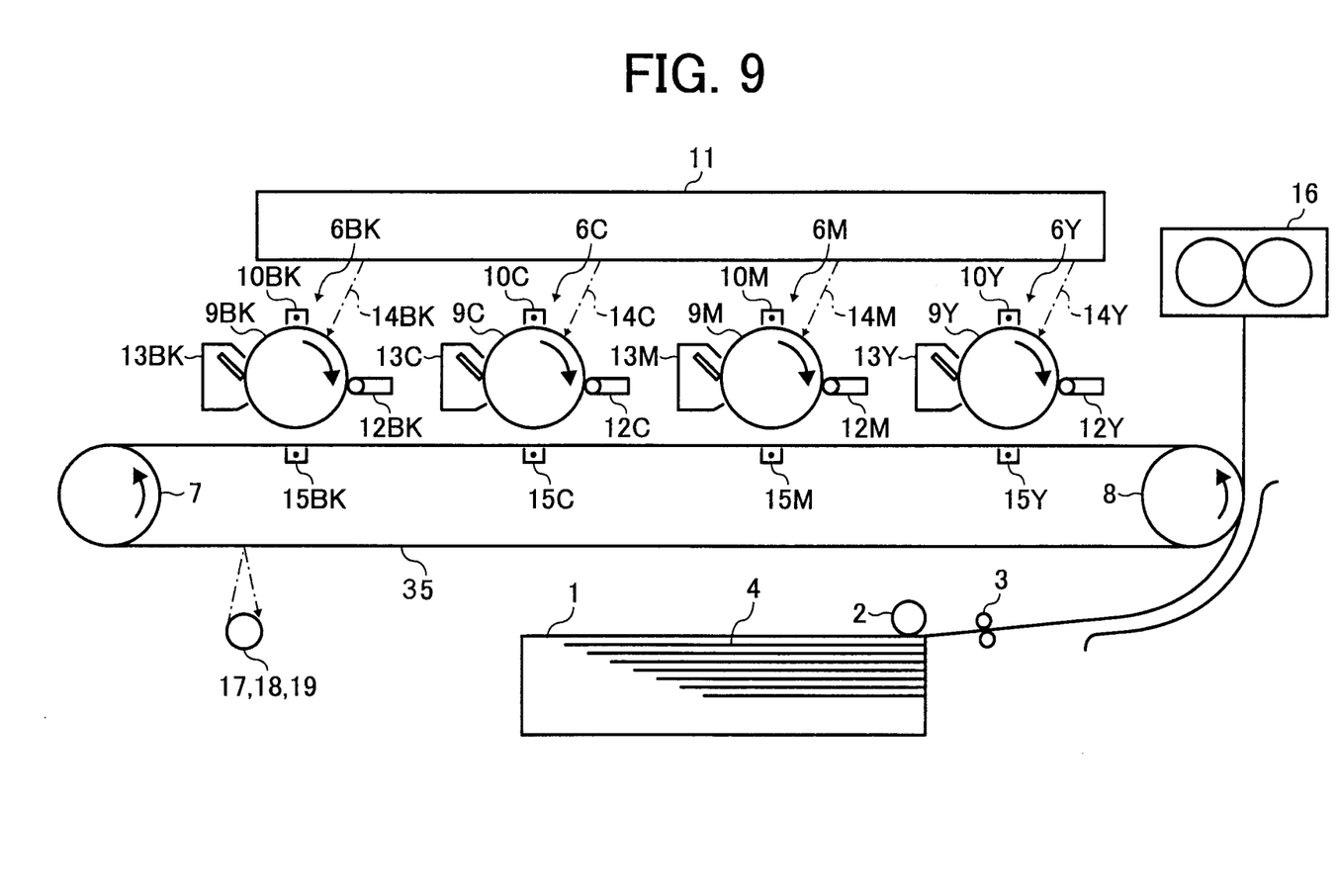
FIG. 9 is a schematic diagram of a color image forming device according to a second embodiment of the present invention.

FIG. 9 is a front view of an image processing unit and a transporting belt for explaining the image-form principle of a color image forming device according to a second embodiment of the present invention. In the color image forming device in this figure, the same reference numbers as in FIG. 1 are appended to the portions the same as in FIG. 1.

In the color image forming device of the second embodiment, the toner image of each color is transferred onto an intermediate transferring belt 35 at a position where the photoconductor drums 9Y, 9M, 9C and 9BK contact with the intermediate transferring belt 35 (a first transferring position) by the operations of the transferring instruments 15Y, 15M, 15C, and 15BK. By this transfer, the full-color image where the image using the toner of each color has been superimposed onto the intermediate transferring belt 35 is formed. In forming images, the paper 4 accommodated in the feeding tray 1 is fed in the order from one stacked at the top and is transported onto the intermediate transporting belt 35, and the toner image in the full-color is transferred onto it at a position where the intermediate transferring belt 35 contacts with the paper 4 (a second transferring position). The paper 4, on which the full-color superimposed image has been formed, is separated from the intermediate transferring belt 35, and the fixing instrument 16 fixes the image, and then, the paper 4 is ejected to outside the image forming device.

The intermediate transferring belt 35 is the endless belt wound around the driving roller 7 and the driven roller 8 that are rotated and driven. According to the present embodiment, the displacement correction pattern is formed on the intermediate transferring belt 35 and is read by the sensors 17, 18, and 19. The specific configuration of the displacement correction pattern and the configuration for creating and detecting it and for obtaining the displacement amount are the same as in the first embodiment.

According the above embodiments, even when environmental changes or a difference in a layout or in a dimension of a portion where a displacement correction pattern is image-form, detected in a design phase or the like is present, the patterns-for-correction-displacement of all sets can be unfailingly detected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A displacement correction device for use in a color image forming device, the displacement correction device comprising:
    a rotating unit that rotates an endless member;
    an image forming unit corresponding to each of a plurality of colors that includes a photoconductor and an exposing unit, and sequentially forms on the rotating endless member a displacement correction pattern image having a line-shaped pattern in a corresponding color;
    a pattern detecting unit that detects the displacement correction patterns on the rotating endless member;
    a storage unit that stores therein detection execution timing information for setting a detection execution timing at which the pattern detecting unit is to detect the displacement correction patterns depending on a tolerance in a layout and a dimension of at least one of the image forming unit, the pattern detecting unit, and the endless member, the detection execution timing including a detection start timing at which the pattern detecting unit starts detection of the displacement correction patterns after starting exposure of the photoconductor by the exposing unit until, and a detection termination timing at which the pattern detecting unit terminates the detection of the displacement correction patterns;
    a controlling unit that controls the pattern detecting unit to detect the displacement correction patterns based on the detection execution timing information stored in the storage unit; and
    an updating unit that updates the detection execution timing information stored in the storage unit when the detection execution timing information differs from a reference timing.

2. The displacement correction device according to claim 1, wherein the updating unit updates the detection execution timing information based on a detection timing of a displacement correction pattern of a reference color.

3. The displacement correction device according to claim 2, wherein the displacement correction pattern of the reference color is a pattern formed by an image forming unit that is farthest from the pattern detecting unit.

4. The displacement correction device according to claim 1, wherein the storage unit includes a nonvolatile storage and a volatile storage, and the detection execution timing information after being updated is stored in the volatile storage.

5. The displacement correction device according to claim 1, wherein the storage unit stores therein a piece of detection execution timing information corresponding to any one of an internal temperature and surrounding temperature of the image forming device, the displacement correction device includes a temperature measuring unit that measures a real temperature, including any one of an internal temperature and surrounding temperature of the image forming device, and the controlling unit controls the pattern detecting unit to detect the displacement correction patterns based on a piece of the detection execution timing information corresponding to the real temperature.

6. The displacement correction device according to claim 5, wherein when no detection execution timing information corresponding to the real temperature is stored in the storage unit, the controlling unit controls the pattern detecting unit to detect the displacement correction patterns based on the detection execution timing information corresponding to a temperature nearest to the real temperature.

7. The displacement correction device according to claim 6, wherein when the displacement correction pattern is detected based on the detection execution timing information corresponding to the temperature nearest to the real temperature, the updated detection execution timing information is stored in the storage unit as the detection execution timing information corresponding to the real temperature.

8. The displacement correction device according to claim 1, wherein the detection execution timing information stored in the storage unit is set in plural number with variables of the number of consecutive prints of the image forming device immediately before image-forming the displacement correction pattern, and the controlling unit controls the pattern detecting unit to detect the displacement correction patterns based on the detection execution timing information corresponding to a count value of the number of consecutive prints immediately before image-forming the displacement correction pattern.

9. The displacement correction device according to claim 8, wherein when no detection execution timing information corresponding to the number of consecutive prints matching with the count value of the number of consecutive prints is stored in the storage unit, the controlling unit controls the pattern detecting unit to detect the displacement correction patterns based on the detection execution timing information relative to the number of consecutive prints nearest to the count value.

10. The displacement correction device according to claim 9, wherein when the displacement correction pattern is detected based on the detection execution timing information relative to the number of consecutive prints nearest to the count value, the updated detection execution timing information is stored in the storage unit as the detection execution timing information corresponding to the count value.

11. An image forming device comprising a displacement correction device, the displacement correction device including
    a rotating unit that rotates an endless member;
    an image forming unit corresponding to each of a plurality of colors that includes a photoconductor and an exposing unit, and sequentially forms on the rotating endless member a displacement correction pattern image having a line-shaped pattern in a corresponding color;
    a pattern detecting unit that detects the displacement correction patterns on the endless member;
    a storage unit that stores therein detection execution timing information for setting a detection execution timing at which the pattern detecting unit is to detect the displacement correction patterns depending on a tolerance in a layout and a dimension of at least one of the image forming unit, the pattern detecting unit, and the endless member, the detection execution timing including a detection start timing at which the pattern detecting unit starts detection of the displacement correction patterns after starting exposure of the photoconductor by the exposing unit until, and a detection termination timing at which the pattern detecting unit terminates the detection of the displacement correction patterns;

a controlling unit that controls the pattern detecting unit to detect the displacement correction patterns based on the detection execution timing information stored in the storage unit; and an updating unit that updates the detection execution timing information stored in the storage unit when the detection execution timing information differs from a reference timing.

12. A displacement correction method comprising:

sequentially forming on a rotating endless member a displacement correction pattern having a line-shaped pattern for each of a plurality of colors by use of a corresponding one of image forming units that includes a photoconductor and an exposed unit;

detecting the displacement correction patterns on the rotating endless member by use of a pattern detecting unit;

setting detection execution timing information for setting a detection execution timing at which the pattern detecting unit is to detect the displacement correction patterns depending on a tolerance in a layout and a dimension of at least one of the image forming unit, the pattern detecting unit, and the endless member, by reading the detection execution timing information from a storage unit, the detection execution timing including a detection start timing at which the pattern detecting unit starts detection of the displacement correction patterns after starting exposure of the photoconductor by the exposing unit until, and a detection termination timing at which the pattern detecting unit terminates the detection of the displacement correction patterns; and updating the detection execution timing information stored in the storage unit when the detection execution timing information differs from a reference timing.

13. The displacement correction method according to claim 12, wherein the updating includes updating the detection execution timing information based on a detection timing of a displacement correction pattern of a reference color.

14. The displacement correction method according to claim 13, wherein the displacement correction pattern of the reference color is a pattern formed by an image forming unit that is farthest from the pattern detecting unit.

15. The displacement correction method according to claim 12, wherein setting includes storing in the storage unit a piece of detection execution timing information corresponding to any one of an internal temperature and surrounding temperature of the image forming device, and the setting includes setting a piece of the detection execution timing information corresponding to a real temperature including any one of an internal temperature and surrounding temperature of the image forming device.

16. The displacement correction method according to claim 15, wherein when no detection execution timing information corresponding to the real temperature is stored in the storage unit, the setting includes setting the detection execution timing information based on the detection execution timing information corresponding to a temperature nearest to the real temperature.

17. The displacement correction method according to claim 16, wherein when the displacement correction pattern is detected based on the detection execution timing information corresponding to the temperature nearest to the real temperature, the updated detection execution timing information is stored in the storage unit as the detection execution timing information corresponding to the real temperature.

18. The displacement correction method according to claim 12, wherein the detection execution timing information stored in the storage unit is set in plural number with variables of the number of consecutive prints of the image forming device immediately before image-forming the displacement correction pattern, and the setting includes setting the detection execution timing information based on the detection execution timing information corresponding to a count value of the number of consecutive prints immediately before image-forming the displacement correction pattern.

19. The displacement correction method according to claim 18, wherein when no detection execution timing information corresponding to the number of consecutive prints matching with the count value of the number of consecutive prints is stored in the storage unit, the setting includes setting the detection execution timing information based on the detection execution timing information relative to the number of consecutive prints nearest to the count value.

20. The displacement correction method according to claim 19, wherein when the displacement correction pattern is detected based on the detection execution timing information relative to the number of consecutive prints nearest to the count value, the updated detection execution timing information is stored in the storage unit as the detection execution timing information corresponding to the count value.

\* \* \* \* \*